Feb. 8, 1966   R. M. VOITIK   3,233,632
BELLOWS RADIUS WELD
Filed Sept. 7, 1962
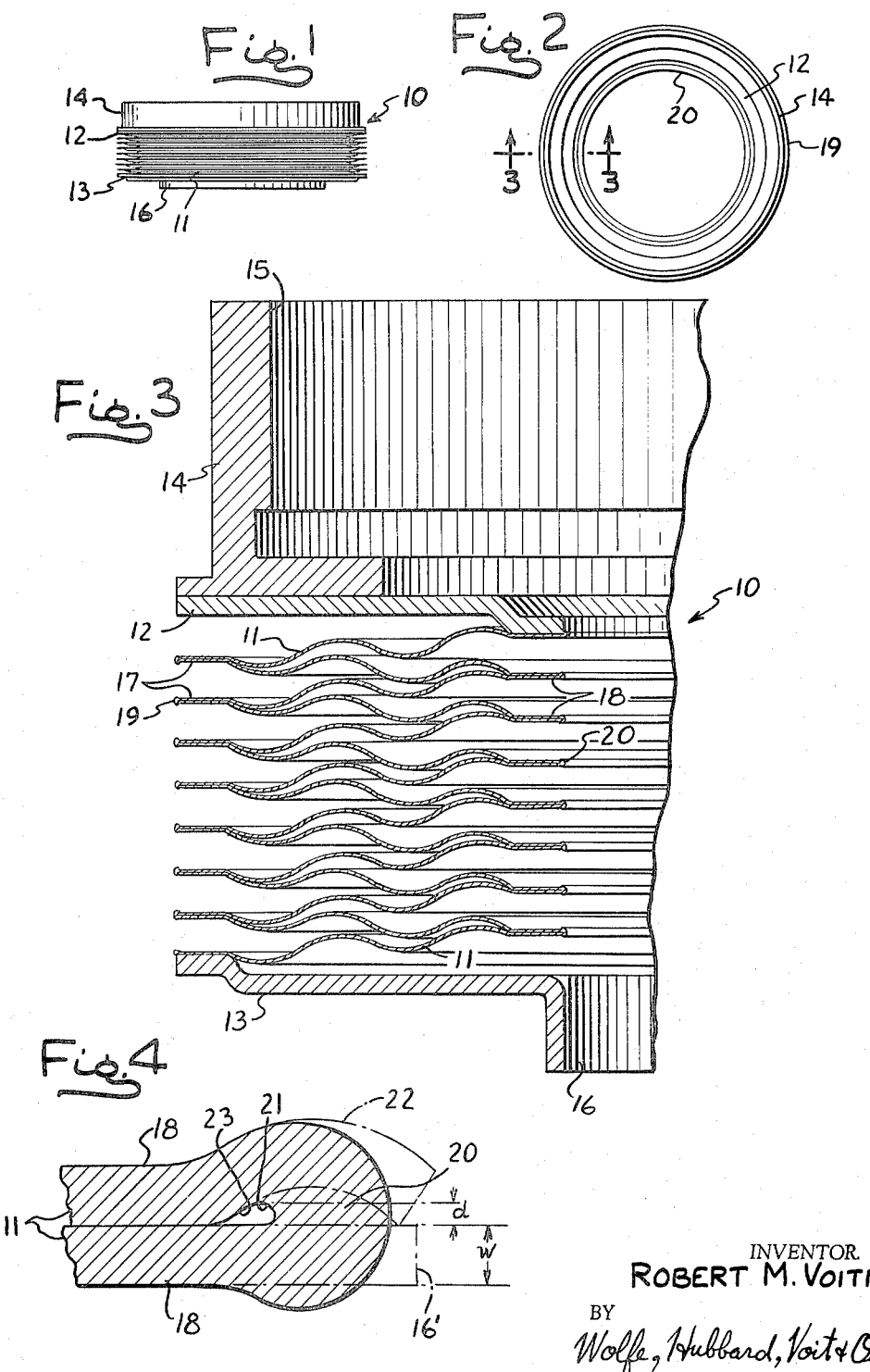
INVENTOR.
ROBERT M. VOITIK
BY
Wolfe, Hubbard, Voit & Osann
ATTYS.

United States Patent Office 3,233,632
Patented Feb. 8, 1966

3,233,632
BELLOWS RADIUS WELD
Robert M. Voitik, Evanston, Ill., assignor to Continental Illinois National Bank and Trust Company of Chicago
Filed Sept. 7, 1962, Ser. No. 221,966
4 Claims. (Cl. 138—121)

The present invention relates to bellows assemblies and their manufacture and more particularly concerns bellows formed of a plurality of metal discs.

The primary aim of the present invention is to provide a metal bellows assembly and method of manufacture particularly adapted for bellows which are subjected to very high cyclical flexure and in which the metal joints are formed to greatly minimize stress concentration that may lead to fatigue failure.

It is another object to provide a bellows assembly of the type in which the bellows discs may be formed in a great variety of shapes, sizes and thicknesses and of different metal substances, as well as permitting the use of many or only a few of such discs to vary the size and operating characteristics of the bellows assembly.

A further object is to provide a bellows assembly as characterized above which is economical to manufacture and extremely dependable in operation.

Other objects and advantages of the invention will become apparent upon reading the following detailed description and upon reference to the drawings, in which:

FIGURE 1 is a side elevation of a bellows assembly embodying the invention;

FIG. 2 is a plan view of the bellows assembly shown in FIG. 1;

FIG. 3 is an enlarged partial section taken along the line 3—3 in FIG. 2; and

FIG. 4 is an enlarged section of the welded connection between two bellows discs, with dash lines indicating the disc outlines before being welded together.

While the invention will be described in connection with a preferred embodiment and procedure, it will be understood that I do not intend to limit the invention to that embodiment or procedure. On the contrary, I intend to cover all alternatives, modfications and equivalents as may be included within the spirit and scope of the invention as defined by the appended claims.

Turning now to the drawings, there is shown a preferred form of a bellows assembly 10 embodying the present invention and including a plurality of stacked discs 11 interconnected between an upper end plate 12 and a lower end plate 13. The upper end plate 12 serves as an adapter for securing the bellows assembly 10 to a ferrule or sleeve 14 having a large inner opening 15. In the present instance, the lower end plate is formed with a flanged opening 16 adapted to mount the bellows on a seal housing (not shown). To achieve a bellows effect, the discs 11 are each formed with a center opening 16' to define an annular shape that permits the passage of fluid between the flanged opening 16 and the ferrule 14. It will be understood by those skilled in this art that pressure fluctuations, mechanical vibrations and relative movement between the upper end plate 12 and the lower end plate 13 cause the discs to flex.

To enhance the sensitivity of the bellows 10 for certain applications, the discs 11, as shown in FIG. 3, have a convoluted cross section which not only increases the surface area of each disc, but also increases their flexibility and accordingly the responsiveness of the bellows assembly 10. Preferably, the discs 11 have a flat peripheral margin 17 and a flat inner margin 18 so that the upper and lower discs mate in surface-to-surface contcat. A welded connection 19 joins the discs 11 in pairs at the peripheral margin 17, and another welded connection 20 at the inner margin 18 joins one disc of a pair to an adjoining disc in another pair. Thus, the margins 17, 18 act as legs for the respective hinge-like welded connections 19, 20 which permits the bellows assembly 10 to expand and collapse as the discs flex in response to varying conditions.

In accordance with the present invention, the welded connections 19, 20 joining the bellows discs 11 are each formed with a smooth internal curve 21 extending between the discs to reduce the stress concentration at the hinge-like connections. Following the preferred procedure, the internal curve 21 of one of the welded connections 20, for example, is developed by first deforming one of the discs 11 adjacent the margin 18 to define an arch 22 about its periphery. As shown by dotted lines in FIG. 4, when the discs 11 are initially placed together, they engage each other along radially spaced apart locations so that the arch 22 defines an annular enclosed recess 23 between the discs and, as the connection 19 is welded, the meniscus action of the solidifying molten metal begins to fill the recess 23. The welding operation is terminated when the recess 23 is partially filled in order to form the internal curve 21 extending from one disc to the other. It is understood that the preformed arch 22 can be applied to both discs to generate the required initial spacing and that the shape of the preformed arch is not limited to the geometry shown.

While the internal geometry of the welded connection 20 may take many forms, in the preferred construction the internal curve 21 has a minimum radius which is greater than $\frac{1}{50}$ but less than the thickness of the discs 11 being joined. As illustrated in FIG. 4 the dimension $d$ indicates the maximum axial spacing between the discs 11 after welding and $w$ indicates the thickness of the disc 11. Stated in other words, the ratio of $d$ to $w$ preferably ranges between 1:25 and 2:1. This ratio range has been found particularly effective in reducing the stress concentration at the welded connections 19, 20 when the bellows is flexed.

It has been found that bellows assemblies constructed having an internal curve 21 as described above are much more dependable in operation than those formed with a conventional welded connection. Since the stress concentration at the hinge-like connections 19, 20 is greatly reduced by the formation of the internal curve 21, the bellows assembly 10 is much less subject to fatigue failure. This feature is of particular importance in bellows which must undergo large numbers of cyclical fluctuations. Tests have shown that bellows assemblies made in accordance with the present invention will last up to ten times longer than conventionally constructed bellows. In addition, the long life and dependability make the present bellows assembly 10 specially suited for critical installations and for situations where the bellows are located in places where replacement of the bellows is expensive and time consuming.

It will also be apparent to those skilled in this art that bellows of many different sizes and shapes can be constructed according to the teachings of the present invention. For example, the number and size of the discs 11 may be varied to suit the particular application. In addition, the present invention is not limited to a particular metal or thickness of the discs, but is suitable for a large group of metal substances, provided they may be suitably welded. The thickness of the discs may range, for example, from .003 to .03 of an inch.

I claim as my invention:

1. In a bellows assembly comprising, in combination: a plurality of discs disposed in stacked relationship relative to each other, adjacent ones of said discs initially having a marginal surface thereof disposed in contact along radially spaced apart locations to define an annular enclosed recess therebetween, and a weld connection joining the margins of the discs together, said connection being effective to partially fill said recess with molten metal to enable meniscus action of solidifying molten metal to form a substantially smooth generally inwardly facing concave surface having a minimum radius that is greater than 1/50 but less than the thickness of the adjacent discs which are joined thereby.

2. In a bellows assembly comprising, in combination: at least three discs disposed in stacked relationship relative to each other, each of said discs being of annular configuration having an opening therethrough, the intermediate disc initially having an outer marginal surface disposed in contact with an outer marginal surface of one of the other discs along radially spaced apart locations to define an annular enclosed recess therebetween with an inner marginal surface of the intermediate disc being in contact with an inner marginal surface of the second other disc along radially spaced apart locations to define another annular enclosed recess therebetween, and a weld connection joining the respective margins of the discs together, said connections being effective to partially fill the respective recesses with molten metal to enable meniscus action of solidifying molten metal to form substantially smooth generally inwardly facing concave surfaces each of which has a minimum radius that is greater than 1/50 but less than the thickness of the discs which are joined thereby.

3. The method of making a bellows assembly from a pair of discs comprising the steps of: initially bringing the discs into engagement with each other along radially spaced apart locations on marginal surfaces thereof to define an annular enclosed recess therebetween, partially filling the recess with molten welding material, and thereafter, allowing the molten welding material to solidify to create a connection between the discs with the meniscus action of the welding material forming a substantially smooth generally inwardly facing concave surface having a minimum radius that is greater than 1/50 but less than the thickness of the discs.

4. The method of making a bellows assembly from a pair of discs comprising the steps of: deforming at least one of the discs along a marginal surface thereof, bringing the discs into engagement with each other along radially spaced apart locations on marginal surfaces thereof so that the deformation defines an annular enclosed recess between the discs, partially filling the recess with molten welding material to create a connection between the discs, and thereafter, allowing the molten welding material to solidify so that the meniscus action thereof will form a substantially smooth generally inwardly facing concave surface having a minimum radius that is greater than 1/50 but less than the thickness of the discs.

References Cited by the Examiner

UNITED STATES PATENTS

| | | | |
|---|---|---|---|
| 1,420,016 | 6/1922 | Bingay | 137—796 |
| 1,726,584 | 9/1929 | Persons | 92—45 |
| 1,786,506 | 12/1930 | Ray | 29—454 |
| 2,534,123 | 12/1950 | Hasselhorn | 137—796 |
| 2,565,296 | 8/1951 | Chyle | 29—454 |
| 2,811,173 | 10/1957 | Benson | 137—796 |
| 2,925,829 | 2/1960 | Thompson | 137—796 |

LAVERNE D. GEIGER, *Primary Examiner.*

EDWARD V. BENHAM, *Examiner.*